United States Patent
Volkmann et al.

(10) Patent No.: US 10,801,648 B2
(45) Date of Patent: Oct. 13, 2020

(54) DEVICE FOR GUIDING LIQUID AND PRODUCTION METHOD

(71) Applicant: ACO Severin Ahlmann GmbH & Co. Kommanditgesellschaft, Büdelsdorf (DE)

(72) Inventors: Karsten Volkmann, Südergellersen (DE); Jan Mieze, Kiel (DE)

(73) Assignee: ACO SEVERIN AHLMANN GMBH & CO. KOMMANDITGESELLSCHAFT, Budelsdorf (DE)

( * ) Notice: Subject to any disclaimer, the term of this patent is extended or adjusted under 35 U.S.C. 154(b) by 0 days.

(21) Appl. No.: 16/075,723

(22) PCT Filed: Feb. 22, 2017

(86) PCT No.: PCT/EP2017/054015
§ 371 (c)(1),
(2) Date: Aug. 6, 2018

(87) PCT Pub. No.: WO2017/144511
PCT Pub. Date: Aug. 31, 2017

(65) Prior Publication Data
US 2019/0078706 A1    Mar. 14, 2019

(30) Foreign Application Priority Data
Feb. 24, 2016    (DE) .................. 10 2016 103 278

(51) Int. Cl.
| | | |
|---|---|---|
| *F16L 13/10* | (2006.01) | |
| *F16L 9/14* | (2006.01) | |
| *C04B 41/00* | (2006.01) | |
| *C04B 41/48* | (2006.01) | |
| *C04B 41/63* | (2006.01) | |
| *F16L 13/11* | (2006.01) | |
| *F16L 13/12* | (2006.01) | |

(52) U.S. Cl.
CPC .............. *F16L 9/14* (2013.01); *C04B 41/009* (2013.01); *C04B 41/4826* (2013.01);
(Continued)

(58) Field of Classification Search
CPC ..... F16L 13/113; F16L 13/124; F16L 25/0027
(Continued)

(56) References Cited

U.S. PATENT DOCUMENTS

RE29,394 E  *  9/1977  Swanson ............. F16L 25/0027
                                                        277/627
4,693,634 A  *  9/1987  Chiaves .................... E04B 1/18
                                                        405/124
(Continued)

FOREIGN PATENT DOCUMENTS

DE     1944761 A1     3/1971
DE     2804814 A1     8/1979
(Continued)

OTHER PUBLICATIONS

Machine Translation WO 01/14277, pp. 12 (Year: 2001).*
The first Office Action issued in corresponding Russian Patent Application No. 2018132975; dated Jun. 19, 2019.

*Primary Examiner* — Sunil Singh
(74) *Attorney, Agent, or Firm* — Pearne & Gordon LLP

(57) ABSTRACT

The invention relates to a device for guiding liquid, in particular a drainage channel, comprising a guiding section (10) and at least one functional region (11), wherein the guiding section (10) is formed of concrete, which has a binder and a filler having a first grain size $K_1$, wherein the functional region (11) is formed at least partially of a filled reaction resin, which has a filler having a second grain size $K_2$, wherein $K_2 < K_1$.

13 Claims, 2 Drawing Sheets

(52) U.S. Cl.
CPC ............ *C04B 41/63* (2013.01); *F16L 13/113* (2013.01); *F16L 13/124* (2013.01)

(58) Field of Classification Search
USPC ........ 405/121, 124–126; 138/155; 285/148.7
See application file for complete search history.

(56) References Cited

U.S. PATENT DOCUMENTS

| | | | | |
|---|---|---|---|---|
| 6,039,359 | A * | 3/2000 | Valenziano | ........... F16L 21/002 |
| | | | | 285/230 |
| 7,429,323 | B2 * | 9/2008 | Deremiah | ................. C02F 1/78 |
| | | | | 138/109 |
| 2009/0176058 | A1 | 7/2009 | Petersen | |

FOREIGN PATENT DOCUMENTS

| | | |
|---|---|---|
| DE | 3429881 A1 | 2/1986 |
| DE | 3524282 C1 | 6/1986 |
| DE | 3713207 A1 | 3/1988 |
| DE | 4137566 A1 | 5/1993 |
| DE | 10215059 A1 | 2/2003 |
| DE | 102004007762 A1 | 9/2005 |
| EP | 0556533 A1 | 8/1993 |
| SU | 945133 A1 | 7/1982 |
| WO | WO 01/14277 A2 * | 3/2001 |

\* cited by examiner

DEVICE FOR GUIDING LIQUID AND PRODUCTION METHOD

FIELD

The invention concerns a device for guiding liquid, in particular a drainage channel as well as a method for the production of such a device.

BACKGROUND OF THE INVENTION

A device of this kind is known from EP 0 556 533 A1.

In order to provide a channel assembly consisting of multiple drainage channels installed end to end that is also fluid-impermeable at the transition between channels, it is possible to introduce sealing means in this section between two channels. To this end the transition joint may be sealed with a sealing substance at the building site to provide a fluid-impermeable connection between the drainage channels. Nevertheless, it is also possible to insert prefabricated seals that are disposed on the body of the channel. It is often the case that particular geometries are required on the body of the channel to facilitate the retention of the seals.

It has become apparent that the formation of special geometries for retaining the seals at the end sections of drainage channels is not easy to achieve. This is mainly due to the fact that there is very little material available at the end section to form, for example, grooves for retaining a seal since modern drainage channels are optimized regarding material usage and thus have a minimal wall thickness only. It is, moreover, problematic with certain materials that are used, in particular (coarse-) grained materials such as cement-based concrete or polymer concrete, to form delicate structures such as, for example, tight grooves for retaining seals.

Particularly in the manufacturing process of channels made of polymer concrete, especially when filling the mold, flaws in form of pores in the region of the groove for retaining the seal can occur, as depicted for example in FIG. 1.

As a result of the pores in this region a fluid-impermeable connection between channels can no longer be ensured with certainty despite the application of the seal. Depending on the frequency, position and number of the pores it is possible that the liquid (for example water) escapes form the channel uncontrolled despite the seal due to the pores in that region. Particularly in instances where environmentally damaging liquids such as oil, petrol or similar end up in the channel, they are not allowed to enter into the soil.

The seals known from the prior art are not sufficiently secure or they are expensive to manufacture. The document DE 35 24 282 C1, for example, describes a seal for concrete pipes with rings, which are provided with a circumferential protrusion resistant to radial tension that is embedded into the material that forms the wall of the pipe. The rings are made from a plastic or rubber substance that may be vulcanized or glued together. Alternatively used are internal linings made from PVC film, as described in DE 28 04 814 A1; however, their connection with the concrete pipe is difficult.

The document EP 0 556 533 A1 stated at the outset describes a concrete pipe with a spigot end and a collar end that act as connecting sections and are made from polymer concrete. Two end sections made from polymer concrete are placed onto the concrete pipe to be processed and are subsequently coated with polymer concrete. This is then covered with a top layer based on unsaturated polyester resins. A number of coating stages are required for the manufacture of such a concrete pipe.

BRIEF SUMMARY OF THE INVENTION

It is the object of the invention to improve the device for guiding liquid, in particular a drainage channel, of the kind described at the outset in such a way that a functional region with satisfactory sealing characteristics can be produced in a simple manner. It is, moreover, the object of the invention to provide a corresponding method.

According to the invention a device for guiding liquid, in particular a drainage channel, is proposed that comprises a guiding section and at least one functional region. The guiding section is made from concrete, which comprises a binding agent and filler with a first grain size $K_1$. The functional region is at least partially formed by a reactive resin with filler of a second grain size $K_2$. Applicable is that $K_2 < K_1$.

The invention has the advantage that the functional region is made from a material that is different to that of the guiding section, where the characteristics of said functional region may be optimized independently from those of the guiding section. This is therefore a device, in particular a drainage channel, which is made from a hybrid material. The materials used differ at least in the size of the grain. According to the invention the filler of the reactive resin in the functional region has a smaller grain size than the concrete of the guiding section. As a result of the more fine-grained filler used in the functional region as compared to the guiding section, a smooth surface, which is essentially free of pores or that has at least fewer pores, is achieved, which improves the tightness of the functional region without requiring any further measures to achieve this.

The second grain size $K_2$, that is, the grain size of the filler of the reactive resin, is preferably 1 mm at most, in particular 500 μm at most, in particular 250 μm at most. The smaller the choice of grain size the smoother the functional region will be and thus containing fewer pores.

The determination of the grain size may take place according to the so-called grindometer test following the standard EN ISO 1524.

In a further preferred embodiment the functional region exhibits a surface roughness k [mm] of 0.02 to 0.05, in particular of 0.03-0.04. The surface quality of the functional region is thus superior to the surface quality of the guiding section made from concrete.

The concrete is preferably polymer concrete. Although it is conceivable to use a cement-based concrete for the manufacture of the guiding section, the use of polymer concrete is preferred.

If the binding agent of the concrete and the reactive resin consist of the same material, in particular a thermoset resin, the guiding section and the functional region may be of a monolithic structure. Bonding agents or adhesives are not necessary in this instance. If different materials are used it is possible to adhesively join the guiding section to the functional region.

In a further preferred embodiment the concrete, in particular the polymer concrete, is provided with a binding agent proportion $H_1$ and the reactive resin is provided with a binding agent proportion $H_2$. Applicable is that $H_2 > H_1$. In other words, the proportion of binding agent in the reactive resin is greater than the proportion of binding agent in the polymer concrete. This measure further improves the tightness and surface quality of the functional region.

The binding agent proportion $H_2$ is preferably greater than 20% by weight, in particular greater than 30% by weight, in particular greater than 50% by weight.

The guiding section and the functional region are preferably firmly bonded. This may be achieved through the monolithic formation by using the same binding agents for the concrete and the reactive resin, or through adhesive bonding of the functional section [sic] with the functional region.

In a particularly preferred embodiment the functional region forms a layer of reactive resin with filler, which is disposed on the guiding section made from concrete. This makes it possible to produce a geometrically accurate functional region in which the surface quality of the functional region is improved in comparison to the guiding section.

The thickness of the layer may be less than 2 mm, in particular from 1 mm to 1 µm. Due to the smaller grain size in the filler of the reactive resin compared to the filler of the concrete, a sufficient sealing capacity is achieved even with a lesser layer thicknesses. The pores present in the concrete of the guiding section are filled and sealed respectively through the layer.

The functional region may form a molded part made from the reactive resin with filler, the cross-section of which conforms essentially to the cross-sectional shape of the guiding section made from concrete, wherein the molded part and the guiding section are in alignment. The molded part may be pre-formed and attached to the guiding section. This makes it possible to achieve larger wall thicknesses in the molded part so that the functional section can be optimized with respect to structural strength.

The functional region may, for example, form a seal for the connection of the guiding section with further components, in particular with channel elements. The invention is not limited to seals between channel elements but extends also to other functional regions in connection with devices for guiding liquid, in particular drainage channels, in which tightness, in particular local tightness, is of importance.

The method according to the invention is based on the thought of providing a device for guiding liquid, in particular a drainage channel, in that the reactive resin with filler is applied in form of a paste onto the guiding section made from concrete for forming the functional region and then cured. Alternatively it is possible to create a molded part from the function resin with filler, which is attached to the guiding section made from concrete.

BRIEF DESCRIPTION OF THE DRAWINGS

The invention will now be explained in greater detail by way of the drawings. Shown are in.

DETAILED DESCRIPTION OF THE INVENTION

Figure 1:
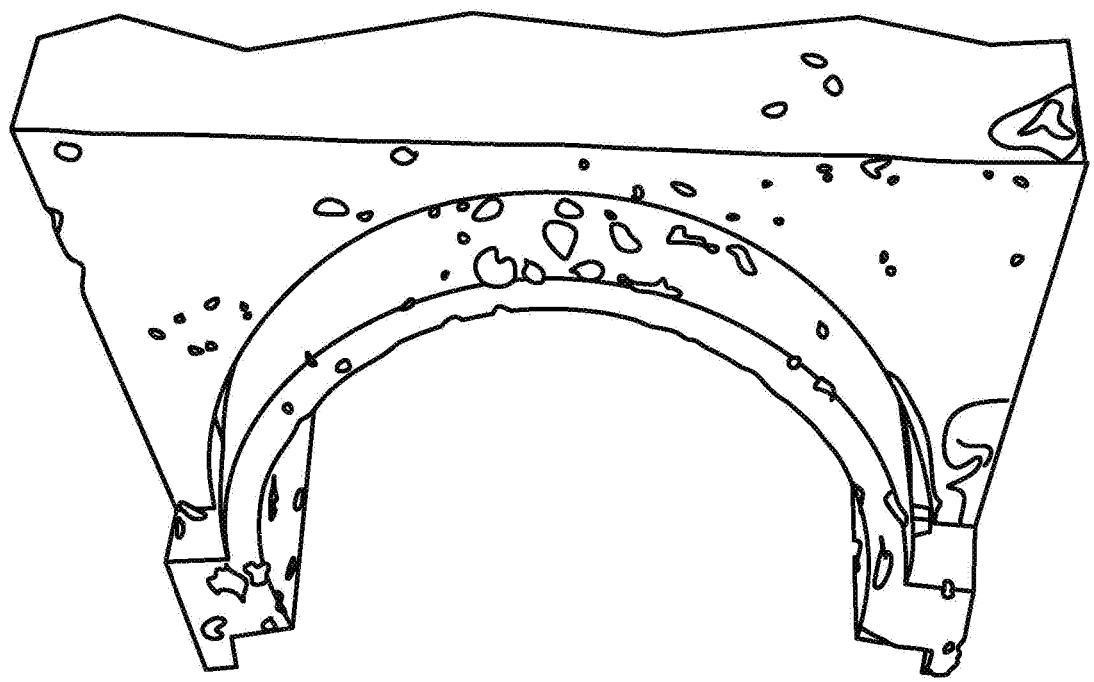
FIG. 1 the end face of a drainage channel with a groove for retaining the seal (prior art)

FIG. 1 clearly depicts the pores or cavities that occur in the bottom section of the seal in the manufacture according to the prior art. The flaws have a negative effect on the tightness in the transition joint between the different channel sections.

Figure 2:
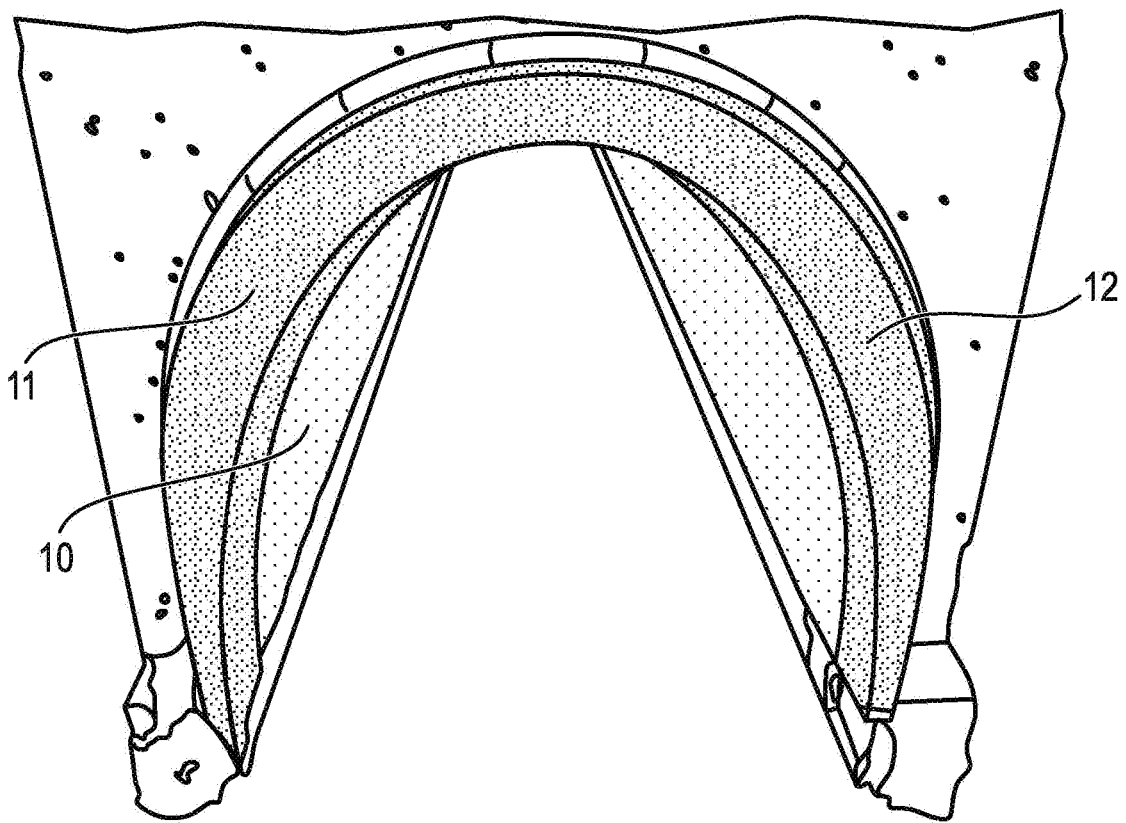
FIG. 2 the end face of a drainage channel made from polymer concrete with a functional region made from a reactive resin with filler.

FIG. 2 depicts an example according to the invention for a drainage channel with a guiding section 10 and a functional region 11. The guiding section 10 in the exemplary embodiment according to FIG. 2 is the channel section through which the liquid, in particular water, flows when in use. The functional region 11 is located at the end of the drainage channel and acts as a seal. Drainage channels of this kind are used, for example, to drain surface water from roads.

The invention is not limited to drainage channels but may be applied to other devices for guiding liquid in which local functional regions with optimized characteristics, such as well-sealing joint sections, are to be provided.

Figure 3:
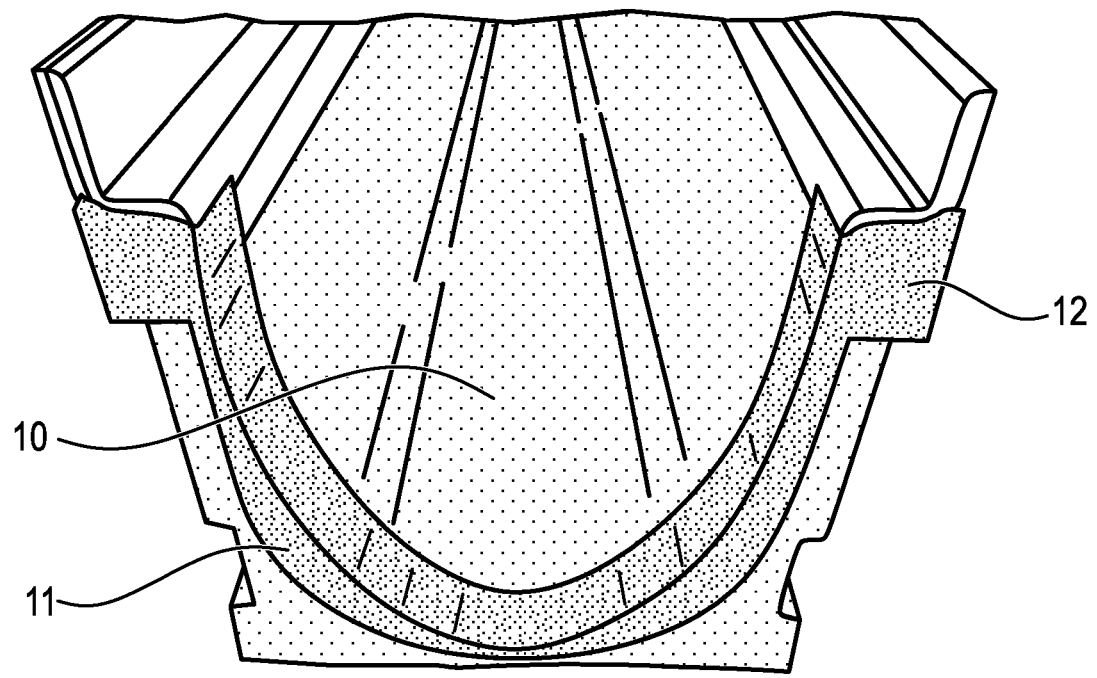
FIG. 3 the end face of a drainage channel with a functional region that finishes flush.
Figure 4:
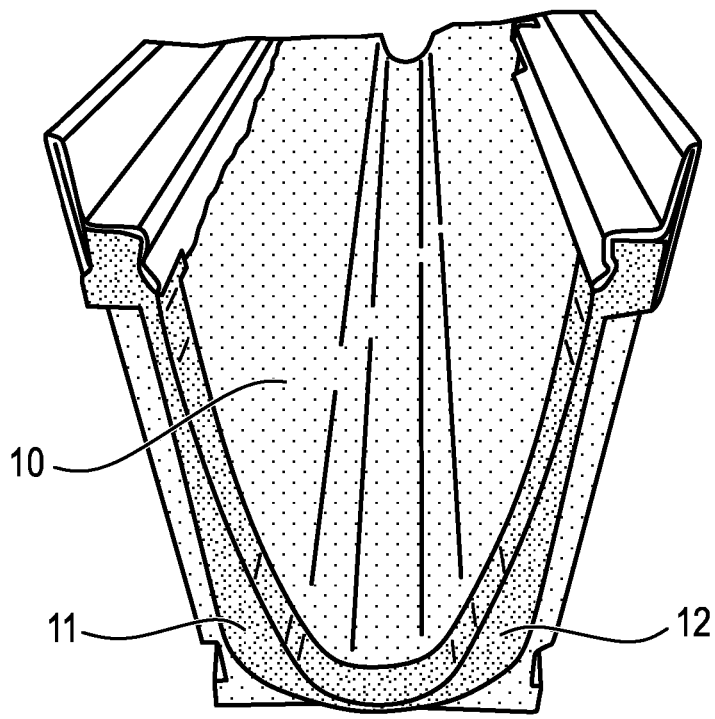
FIG. 4 the end face of a further drainage channel with a modified cross-sectional profile in which the functional region finishes flush with the guiding section.

The guiding section 10 according to FIG. 2 is made from polymer concrete. It is possible to use cement-based concrete instead of polymer concrete. As is well known, the polymer concrete is comprised of a binding agent, for example a polyester resin, and filler with a first grain size $K_1$. For the manufacture of the functional region 11 a reactive resin with filler is used, which comprises a binding agent, for example a thermoset resin and filler, the grain size $K_2$ of which is smaller than the grain size $K_1$ of the polymer concrete in the guiding section 10. Specifically, a reactive resin with filler is used for the functional region 11 so that the functional region 11 forms a particularly smooth surface with fewer pores, in particular a surface without pores. The use of the reactive resin as material for the functional region makes different adaptations possible, for example color-related or geometrical adaptations, as is depicted in FIGS. 2, 3 and 4. In the exemplary embodiment according to FIG. 2 the functional region 11 is distinguished in color.

Generally speaking, through the use of the reactive resin with filler for the functional region 11 in conjunction with the guiding section 10 made from polymer concrete, a hybrid material is provided, the characteristics of which may be optimized on site through adaptation of the composition of the reactive resin. This may not only improve the tightness of the functional region but also its strength characteristics and its sensitivity to impact, that is, the brittleness of it. Nevertheless, the most important aspect in view of the tightness is a reduction in the number of pores and reduced roughness.

In FIGS. 2-4 the functional region 11 is a molded part, which is firmly bonded to the guiding section 10. This may be formed, for example, through adhesive bonding or, if the binding agent of the polymer concrete corresponds with the reactive resin in the functional region, as a monolithic connection. In the latter instance the functional region differs from the guiding section mainly in the grain size of the fillers, which in the functional region is smaller than in the guiding section.

Instead of using a molded part, the functional region may be in form of a layer, which is applied and firmly bonded to the concrete of the guiding section.

Channel assemblies, formed from drainage channels according to FIGS. 2-4, have the advantage that the transition section between the channels is fluid-impermeable. This is achieved through the smooth (dense) surface in the section channel seal channel.

To be able to form such smooth surfaces also in channels made from a coarser material such as concrete or polymer concrete, when assembling these functional regions 11 an additional material in form of a paste is disposed in the channel. This material has a consistency that differs from the polymer concrete. The characteristics of the pasty material mix as a further material component may be adapted to the requirements in this functional region depending on the kind and quantity of the filler as well as the choice of grain size. Tightness in particular is of importance in the transition area between the channels. As a result a smooth surface free of pores in this area is of particular interest. Nevertheless, improved strength characteristics as well as low impact sensitivity (brittleness) are also desirable. In essence, the paste may be applied to all areas of the channel at which it is necessary to change the material characteristics, in particular concerning porosity, roughness and strength or to adapt them to particular functions.

A material mix is used in the functional region 11, which has a high, very fine filler content as well as well as higher resin content compared to the usual polymer concrete. Thermoset resins are used as binding agents. This has the advantage that the component that consists of the additional material binds with the polymer concrete, which is also thermoset, for example during the manufacturing process of the channel. No additional adhesive is required.

Even when using the paste-like material mix as an adhesive between two thermoset resin concrete parts, it is able to establish a friction-locked connection.

It is also conceivable to adhesively attach or cast-in retrospectively the additional material component into the end face of the channel to form the functional region as a prefabricated molded part.

In order to adapt the additional material component in terms of color to the polymer concrete used, corresponding coloring substances/pigments may be added to the paste-like material mix (see FIGS. 2, 3).

Compared to polymer concrete, said paste-like material characteristic is vastly superior in many ways and is to be regarded to be of higher quality compared to polymer concrete. Especially with regard to mechanical loading, the application of material mixes (paste) has significant advantages compared to polymer concrete, in particular concerning durability. Compared to polymer concrete, paste-like material mixes have virtually no porosity even after curing, and thus have no capacity to absorb water. This makes it absolutely impervious to, for example, frost and de-icing salt conditions.

The material mix has the following material characteristics.

Bending Strength

The bending strength of the cured and originally pasty material mix is between 10 and 60 N/mm$^2$ and is therefore considered to be in the region of ultra-high strength material compositions. Thus the material mix, which is generally between 18 and 28 N/mm$^2$, has generally a bending strength that is three times higher and is therefore significantly stronger than polymer concrete. One particular advantage of such a high material strength lies, moreover, in the fact that it is possible to achieve a low sensitivity of the polymer concrete with regard to shock and impact loads through setting a relatively low elasticity modulus. This results at the same time in a high resistance to alternating or oscillating loads (fatigue strength) as well as a high abrasive resistance on surfaces of material mixes, so-called paste components.

High Early Strength (Even at Low Temperatures)

Due to the curing mechanism the final strength of material mixes (paste) is already achieved in less than 10 minutes. This constitutes an enormous advantage compared to polymer concrete since even composite early high-strength polymer concrete is unable to achieve this time.

Chemical Resistance

The material mix is resistant in that medium that complies with the polymer concrete specifications according to the ACO polymer concrete chemical resistance chart issue January 2012. An exchange of the resin matrix of the material mix for a higher-order and chemically resistant resin type is possible at any time.

Low Propensity to Shrinkage Cracking

Material mixes tend towards higher early stage shrinkage than polymer concrete. However; since the final strength is already achieved very early and the curing process is fully completed, there is then virtually no danger of surface cracking at an early age.

In addition, the high bending tensile strength and the possibility of adapting the elasticity modulus in a certain range to the application reduce the danger of cracking when installed. Even if cracks occur, the dense binding agent matrix in combination with the high strength largely prevents any damage from extending further.

High Density

Since material mixes (pastes) are practically non-porous, there is no inclination to absorb liquid. Material mixes (pastes) are thus deemed to be absolutely leak-proof. This results in further positive characteristics. They are resistant to chemically aggressive environments and they easily resist frost conditions as well as frost/de-icing salt conditions; in this respect they are therefore ideally suited to applications under permanent stress.

Sedimentation Stability

Excellent sedimentation stability is achieved due to the high viscosity of the system.

Waste Disposal

Since the polymerizates of styrene are groundwater-neutral, waste residues of the polymerization product may be disposed of as domestic waste. With regard to environmental pollution there is no reason why it should not be recycled as aggregate or granulate respectively.

Hazard caused by respirable fibers during milling and drilling work can be excluded with material mixes (paste) since there are no reinforcing fibers present. With residual styrene content at the specified values and a concentration gradient in the wall section there is no possibility of a contamination of the ground water through surface contact with the channel wall.

Recycling

Recycling of the cured composite material (material mix and polymer concrete) as dry substitute is possible without environmental impact.

Excellent Durability

The above-described material characteristics of the material mix (paste) are pivotal for the fact that they can be considered durable for a broad application spectrum. It has advantages compared to polymer concrete mainly due to its tightness.

A replacement of the binding agent (resin) in the material mix (paste) for a higher-quality type that is resistant to chemicals is possible at any time. This has no negative effect on the mechanical characteristics.

Material Characteristics 2K reactive resin molding material with filler consisting of a binding agent based on UP resin (reactive resin), catalyst (curing agent) and mineral fillers, in particular meal and very fine fillers (proportion of solids >50%).

The material mix consists of reactive resin molding material with filler following DIN EN 18820 Part 1 (Revision 1 July 2015).

| Type of test | Test results |
| --- | --- |
| Density | >1.2 g/mL |
| Chemical resistance | According to ACO polymer concrete resistance chart issue January 2012 corresponding to (pH 1-pH 12) |
| Elastic modulus | >12000 N/mm$^2$ |
| Pull-out strength | >4 N/mm$^2$ |
| Bending tensile strength | >10 N/mm$^2$ |
| Compressive strength | >50 N/mm$^2$ |
| Shear strength | >4 N/mm$^2$ |
| Abrasion resistance | <5 mm |
| Resistance to high-pressure flushing | At least 120 bar |
| Environmental sustainability | According to KTW recommendations category C |
| Waste disposal and recyclability | Current guidelines |

The invention claimed is:

1. A drainage channel for guiding liquid, the drainage channel comprising a guiding section (10) for guiding the liquid and functional region (11), the functional region (11) bonded on an end of the guiding section (10), wherein the guiding section (10) is made from concrete that contains a binding agent and a filler with a first grain size $K_1$, and wherein the functional region (11) is made at least partially from a reactive resin with a filler with a second grain size $K_2$, wherein $K_2<K_1$.

2. The drainage channel according to claim 1, wherein the second grain size $K_2$ is at most 1 mm, wherein grain size is determined by a test following standard EN ISO 1524.

3. The drainage channel according to claim 1, wherein the functional region (11) has a surface roughness k [mm] of 0.02 to 0.05.

4. The drainage channel according to claim 1, wherein the concrete is a polymer concrete.

5. The drainage channel according to claim 4, wherein the binding agent of the concrete and the reactive resin consist of the same thermoset resin.

6. The drainage channel according to claim 4, wherein the concrete is provided with a binding agent proportion $H_1$ and the reactive resin is provided with a binding agent proportion $H_2$, wherein $H_2>H_1$.

7. The drainage channel according to claim 6, wherein the binding agent proportion $H_2$ is greater than 20% by weight.

8. The drainage channel according to claim 4, wherein the guiding section (10) and the functional region (11) are firmly bonded.

9. The drainage channel according to claim 8, wherein the functional region (11) forms a layer of the reactive resin with filler, disposed on the guiding section (10) made from concrete.

10. The drainage channel according to claim 9, wherein the thickness of the layer of the reactive resin with filler is less than 2 mm.

11. The drainage channel according to claim 8, wherein the functional region (11) is a molded part (12) made from the reactive resin with filler, the cross-sectional shape of the molded part (12) conforms to the cross-sectional shape of the guiding section (10) made from concrete, wherein the molded part (12) and the guiding section (10) are in alignment.

12. The drainage channel according to claim 1, wherein the functional region (11) forms a seal for joining the guiding section (10) to further channel element.

13. A method for the production of the drainage channel for guiding liquid according to claim 1, in which the reactive resin with filler in the form of a paste is applied to the guiding section (10) made from concrete to form the functional region (11) and then the paste is cured.

* * * * *